(12) United States Patent
Ishimatsu et al.

(10) Patent No.: US 9,979,264 B2
(45) Date of Patent: May 22, 2018

(54) METHOD FOR MANUFACTURING LAMINATED ROTOR CORE

(71) Applicant: Mitsui High-tec, Inc., Kitakyushu-shi, Fukuoka (JP)

(72) Inventors: Hisatomo Ishimatsu, Kitakyushu (JP); Hirotoshi Mabu, Kitakyushu (JP); Yoshiaki Yamamoto, Kitakyushu (JP); Iwao Myojin, Kitakyushu (JP)

(73) Assignee: MITSUI HIGH-TEC, INC., Kitakyushu-shi (JP)

( * ) Notice: Subject to any disclaimer, the term of this patent is extended or adjusted under 35 U.S.C. 154(b) by 444 days.

(21) Appl. No.: 14/388,719

(22) PCT Filed: Feb. 26, 2013

(86) PCT No.: PCT/JP2013/054943
§ 371 (c)(1),
(2) Date: Sep. 26, 2014

(87) PCT Pub. No.: WO2013/150837
PCT Pub. Date: Oct. 10, 2013

(65) Prior Publication Data
US 2015/0054196 A1  Feb. 26, 2015

(30) Foreign Application Priority Data
Apr. 3, 2012 (JP) .................. 2012-084939

(51) Int. Cl.
*B29C 45/14* (2006.01)
*H02K 15/03* (2006.01)
(Continued)

(52) U.S. Cl.
CPC ............. *H02K 15/03* (2013.01); *B29C 45/02* (2013.01); *B29C 45/14* (2013.01); *B29C 45/14467* (2013.01); *H02K 15/12* (2013.01)

(58) Field of Classification Search
None
See application file for complete search history.

(56) References Cited

U.S. PATENT DOCUMENTS

| 2009/0174273 A1 | 7/2009 | Watanabe et al. |
| 2009/0189309 A1 | 7/2009 | Matsubayashi et al. |
| 2014/0196276 A1* | 7/2014 | Nagai .................... H02K 15/03 29/598 |

FOREIGN PATENT DOCUMENTS

| CN | 101300728 A | 11/2008 |
| JP | 61-150638 A | 7/1986 |

(Continued)

OTHER PUBLICATIONS

International Search Report dated Apr. 16, 2013 issued in corresponding application No. PCT/JP2013/054943.
(Continued)

*Primary Examiner* — Edmund Lee
(74) *Attorney, Agent, or Firm* — Westerman, Hattori, Daniels & Adrian, LLP (57) ABSTRACT

A method for manufacturing a laminated rotor core comprises a first step of positioning and mounting a laminated core body 14 on a mounting table 17 of a carrying tray 16, a second step of positioning and arranging the laminated core body 14 mounted on a mounting table 17 on a lower die 28, the laminated core body 14 having permanent magnets 15 inserted into respective magnet insertion holes 11 and 12, and clamping the laminated core body 14 mounted on the mounting table 17 by an upper die 29 and a lower die 28, and a third step of pushing resin out of resin reservoir pots 42 provided in the lower die 28 and filling the respective corresponding magnet insertion holes 11 and 12 of the laminated core body 14 with the resin through resin passages 43 formed in the mounting table 17.

9 Claims, 10 Drawing Sheets

(51) Int. Cl.
    *B29C 45/02*     (2006.01)
    *H02K 15/12*     (2006.01)

(56) References Cited

FOREIGN PATENT DOCUMENTS

| | | |
|---|---|---|
| JP | 2562821 Y2 | 2/1998 |
| JP | 10-66316 A | 3/1998 |
| JP | 2000-166190 A | 6/2000 |
| JP | 3786946 B1 | 6/2006 |
| JP | 2007-336718 A | 12/2007 |
| JP | 2008-199890 A | 8/2008 |
| JP | 4429258 B2 | 3/2010 |
| JP | 2011-55687 A | 3/2011 |
| JP | 2012-10595 A | 1/2012 |
| JP | 5023124 B2 | 9/2012 |
| JP | 5486574 B2 | 5/2014 |

OTHER PUBLICATIONS

Notice of Reasons for Refusal dated May 5, 2016, issued in counterpart Chinese Patent Application No. 201380020737.3, with English translation. (12 pages).

Decision to Grant a Patent dated Aug. 2, 2016, issued in counterpart Japanese Patent Application No. 2015-239384, with English translation. (6 pages).

\* cited by examiner

PRIOR ART

METHOD FOR MANUFACTURING LAMINATED ROTOR CORE

TECHNICAL FIELD

The present invention relates to a method for manufacturing a laminated rotor core in which permanent magnets are resin-sealed into magnet insertion holes of a laminated core body formed by laminating a plurality of core pieces and having a shaft hole in the center thereof.

BACKGROUND ART

Conventionally, laminated rotor cores (also referred to as rotor cores) used for motors are manufactured by laminating a plurality of core pieces, inserting permanent magnets into a plurality of magnet insertion holes formed around a central shaft hole, and injecting and curing resin.

This resin injection, for example, as described in Patent Literature 1, is performed by putting a laminated rotor core between an upper die and a lower die of a die after inserting permanent magnets into a plurality of magnet insertion holes, and pushing down plungers from resin reservoir pots provided in the upper die. However, there are problems described below when resin is injected into each magnet insertion hole from above permanent magnets.

Since the height of a laminated rotor core is higher than the heights of permanent magnets, there are slight differences in level (approximately 0.5-1 mm) between the top surface of a laminated rotor core and the top surfaces of permanent magnets. Therefore, resin injected into magnet insertion holes flows in every possible direction through these uneven portions, and since resin is injected into passages (gaps), prioritizing those with large cross-sectional areas, it becomes impossible for the flow of resin to control (fix the permanent magnets on the outer circumferential side by making resin flow into targeted passages, for example, passages on the inner side in the radial direction) the positions of permanent magnets inside each magnet insertion hole. Consequently, positions where permanent magnets are arranged become misaligned (e.g., leaned inward, leaned outward, tilted, etc.) inside each magnet insertion hole, leading to increases in losses, noises and even vibrations when operating a motor.

Also, in Patent Literature 2, a method for manufacturing a laminated rotor core having processes (A)-(K) in FIG. 10 is disclosed. More specifically, the method has the following processes:
(A) Setting up a laminated core body 81 on a carrying tray 80
(B) Tilting the laminated core body 81 together with the carrying tray 80 and inserting permanent magnets 82 into each magnet insertion hole of the laminated core body 81
(C) Setting up a cull plate 83 on the laminated core body 81 after leveling the carrying tray 80
(D) Inverting the carrying tray 80, and the cull plate 83, the carrying tray 80 and the cull plate 83 being in a direct contact with the laminated core body 81
(E) Mounting the laminated core body 81 on a lower die 84, the laminated core body 81 having the carrying tray 80 and the cull plate 83 set up
(F) Holding the laminated core body 81 between an upper die 85 and the lower die 84 and injecting resin into the magnet insertion holes of the laminated core body 81 from the lower die 84, the laminated core body 81 being mounted on the cull plate 83 and further being covered by the carrying tray 80

Additionally, the method has processes (G) and (H) in which the laminated core body 81 is removed from the upper die 85 and the lower die 84, the laminated core body 81 having been resin-sealed and having the cull plate 83 mounted thereunder and the carrying tray 80 mounted thereon. In process (H), there is resin remained in the resin reservoir pots and cured which is adhering to the bottom portion of the cull plate 83. Next, in process (I), the laminated core body 81 is inverted, and after going through process (J) in which the cull plate 83 on the upper portion of the laminated core body 81 is torn off and process (K) in which the resin adhering to the cull plate 83 is removed by using pins 86 in order to reuse the cull plate 83, a resin-sealed laminated rotor core is manufactured. Also, the cull plate 83 has resin passages and gates, the resin passages guiding resin from the resin reservoir pots to magnet insertion holes of a laminated core body 81, the gates being insertion openings for resin flowing into magnet insertion holes.

Figure 10A:
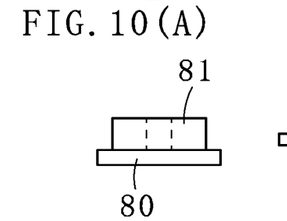
FIGS. 10(A) to 10(K) are explanatory diagrams of each process of a method for manufacturing a laminated rotor core according to a conventional example.
Figure 10B:
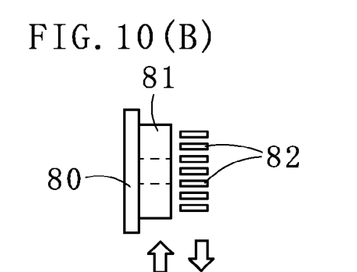
Figure 10C:
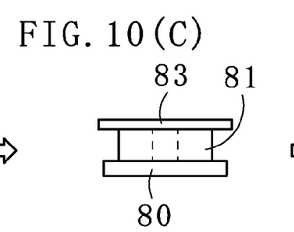
Figure 10D:
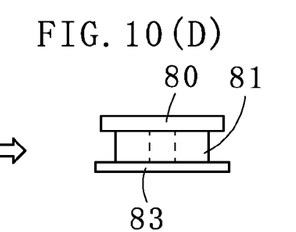
Figure 10E:
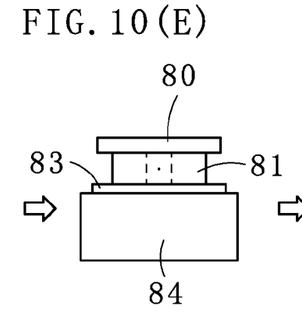
Figure 10F:
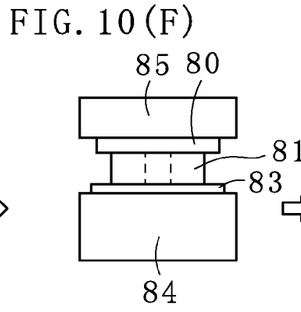
Figure 10G:
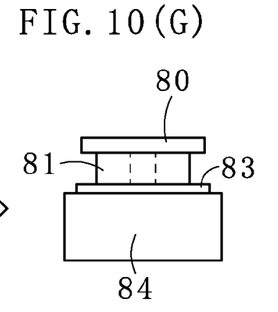
Figure 10H:
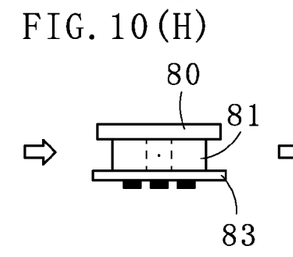
Figure 10I:
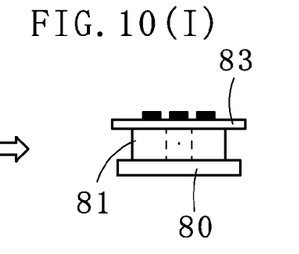
Figure 10J:
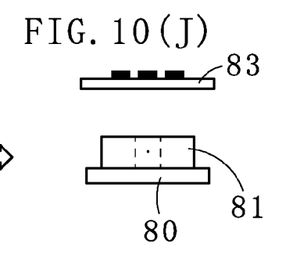
Figure 10K:
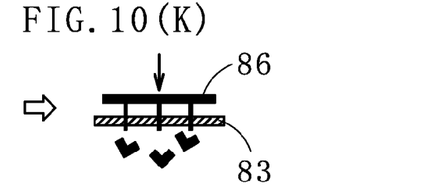

By injecting resin from the lower die 84 as just described, the bottom surfaces of permanent magnets 82 can be appressed to the cull plate 83. Therefore, when injecting resin, permanent magnets 82 do not lean inward, lean outward or become tilted inside magnet insertion holes, and as compared with a construction method of injecting resin from an upper die, there is an advantage of being able to manufacture a laminated rotor core with alleviated noise and loss, and even with alleviated vibration.

CITATION LIST

Patent Literature

Patent Literature 1: Japanese Unexamined Patent Application Publication No. 2007-336718
Patent Literature 2: Japanese Unexamined Patent Application Publication No. 2011-055687

SUMMARY OF INVENTION

Technical Problem

However, in the technique of injecting resin into magnet insertion holes of a laminated core body from a lower die according to Patent Literature 2, it is necessary for a laminated core body mounted on a carrying tray to be inverted 180 degrees at the time of arranging a die before injecting mold resin and at the time of removing a die after injecting mold resin. It is troublesome to invert the laminated core body and the carrying tray in this kind of state.

Moreover, a cull plate holds permanent magnets inserted into magnet insertion holes of a laminated core body to prevent them from falling, therefore, it is necessary for a laminated core body to be retained by being held between the cull plate and the carrying tray during the work of inverting.

If the carrying tray falls during the work of inverting, workers might get injured, and a laminated core body gets damaged in some cases. Here, it is possible to fix the carrying tray and the cull plate by bolts and the like when inverting, however it inevitably worsens the workability and the equipment for the manufacture become complex and expensive, which leads to a rise in the manufacturing cost.

Moreover, using a cull plate keeps resin scraps (culls) from remaining directly in a laminated core body (laminated rotor core), however, an extra process must be added for fitting the cull plate on a laminated core body. Also, even after the resin-sealing of magnet insertion holes of a laminated rotor core is completed, there is an additional process of removing the cull plate from the laminated core body, and in the case of reusing the cull plate, there is another additional process of removing resin scraps adhering to the cull plate. This lowers the work efficiency.

The present invention has been made in view of the above circumstances, and an object thereof is to provide a method for manufacturing a laminated rotor core which does not require a vertical inversion of a carrying tray and in which work efficiency is also remarkably improved.

Solution to Problem

In order to achieve the above object, according to a first aspect of the present invention, there is provided a method for manufacturing a laminated rotor core having a shaft hole formed in the center and a plurality of magnet insertion holes formed around the shaft hole and in which the permanent magnets are inserted into the respective magnet insertion holes and resin-sealed, the method comprising: a first step of positioning and mounting the laminated core body on a carrying tray;
a second step of positioning and arranging the carrying tray on a lower die with the laminated core body mounted on the carrying tray, the laminated core body having the permanent magnets inserted into the respective magnet insertion holes thereof, and clamping the laminated core body mounted on the carrying tray by an upper die and the lower die; and
a third step of pushing resin out of resin reservoir pots provided in the lower die and filling the respective corresponding magnet insertion holes of the laminated core body with the resin through the resin passages formed in the carrying tray.

According to a second aspect of the present invention, in the method for manufacturing a laminated rotor core of the first aspect of the present invention, resin passages have opened bottom portions and receive resin pushed out of resin reservoir pots from underneath, and resin fills, for example, the regions on the inner side in the radial direction of the magnet insertion holes through gates formed in the regions of the resin passages, the gates penetrating from the bottom portions to the upper portions. In this case, part of each gate and part of each magnet insertion hole are overlapped in planar view.

According to a third aspect of the present invention, in the method for manufacturing a laminated rotor core of the second aspect of the present invention, the resin passages are opened downward in a tapered state, and the peripheral walls of the resin passages are opened outward.

According to a fourth aspect of the present invention, in the method for manufacturing a laminated rotor core of the third aspect of the present invention, there are through-holes formed on the upper portions of the resin passages besides the gates, and after resin-sealing the laminated core body, resin remained on the carrying tray is punched out by pins passing through the through-holes.

According to a fifth aspect of the present invention, in the methods for manufacturing a laminated rotor core of the first to fourth aspects of the present invention, the carrying tray is rectangular-shaped in planar view, and paired supporting members are provided on both sides of the upper die for the positioning and temporal placement of the carrying tray having the laminated core body mounted thereon.

According to a sixth aspect of the present invention, in the methods for manufacturing a laminated rotor core of the first to fifth aspects of the present invention, the lower die is provided with a plurality of the resin reservoir pots, and resin flown from one resin reservoir pot fills one or more of the magnet insertion holes through the resin passages.

According a seventh aspect of the present invention, in the methods for manufacturing a laminated rotor core of the first to sixth aspects of the present invention, the positioning of a laminated core body and the carrying tray is performed through at least two first positioning pins and punched holes, the first positioning pins projecting upward from the carrying tray, the punched holes being formed by vertically penetrating the laminated core body.

According to an eighth aspect of the present invention, in the methods for manufacturing a laminated rotor core of the first to seventh aspects of the present invention, the positioning of the carrying tray and the lower die is performed by at least two second positioning pins and positioning holes into which the second positioning pins are to be inserted, the second positioning pins being formed in the lower die and projecting upward, the positioning holes being provided in the carrying tray.

According to a ninth aspect of the present invention, in the methods for manufacturing a laminated rotor core of the first to eighth aspects of the present invention, vent grooves are provided in the carrying tray in order to release the air inside the magnet insertion holes to the outside at the time of resin-sealing. Additionally, the depths of the vent grooves are smaller than the grain size of fillers mixed in sealing resin.

Moreover, in the methods for manufacturing a laminated rotor core of the above inventions, it is preferred that the carrying tray have a shaft in the center to be inserted into a shaft hole of a laminated rotor core, however, this shaft is not an essential factor.

Advantageous Effects of Invention

In the methods for manufacturing a laminated rotor core of the first to tenth aspects of the present invention, it is unnecessary to invert the carrying tray unlike the conventional methods. Therefore, there is no need to install an equipment for the inversion of the carrying tray, which improves the workability and reduces the manufacturing cost.

Additionally, the carrying tray is also used as the cull plate, thus it is unnecessary to prepare a cull plate separately.

Also, since the carrying tray is provided with the resin passages for guiding resin from the resin reservoir pots formed in the lower die to corresponding magnet insertion holes of a laminated core body, resin can be injected into magnet insertion holes directly from the carrying tray.

Especially, in the method for manufacturing a laminated rotor core according to the second aspect of the present invention, the resin passages have the opened bottom portions and receive resin flown from the resin reservoir pots from underneath, and the resin fills the magnet insertion holes through the gates formed in the regions of the resin passages and penetrating from the bottom portions to the upper portions. Therefore, the resin initially fills the regions of the gaps between the magnet insertion holes and the permanent magnets, enabling the resin injection with the inserted permanent magnets kept either on the outer side or inner side in the radial direction of the magnet insertion holes.

In the methods for manufacturing a laminated rotor core according to the third and fourth aspects of the present invention, the resin passages are in a tapered state, the peripheral walls of the resin passages being opened outward, the resin passages being opened downward, which makes it easy for cured resin to fall downward. Therefore, by forming the through-holes on the upper portions of the resin passages besides the gates, after resin-sealing a laminated core body, resin remained on the carrying tray can be punched out downward by the pins passing through the through-holes.

Meanwhile, in the method for manufacturing a laminated rotor core according to the fifth aspect of the present invention, the carrying tray is rectangular-shaped (e.g., square-shaped) in planar view, and the paired supporting members are provided on both sides (e.g., lower portions of both sides) of the upper die for the positioning and temporal placement of the carrying tray having a laminated core body mounted thereon. Therefore, it is possible to temporarily place the carrying tray on these supporting members in order to mount the carrying tray on the lower die and to remove the carrying tray.

DESCRIPTION OF EMBODIMENTS

Next, with reference to the accompanying drawings, descriptions of embodiments embodying the present invention will be given.

Figure 1A:
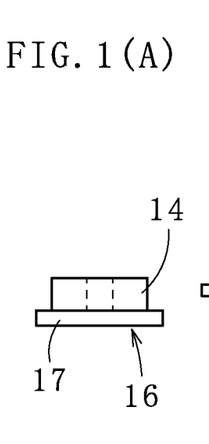
FIGS. 1(A) to 1(H) are explanatory diagrams of a method for manufacturing a laminated rotor core according to one embodiment of the present invention.
Figure 2:
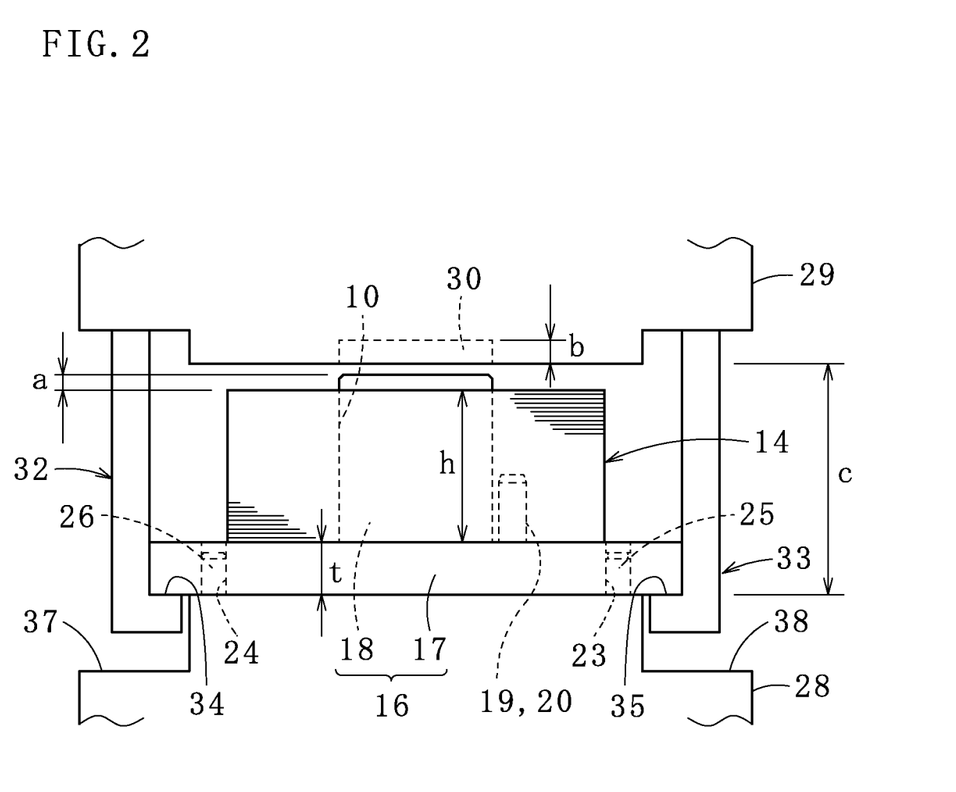
FIG. 2 is a front view illustrating a halfway process of the method for manufacturing a laminated rotor core.
Figure 3:
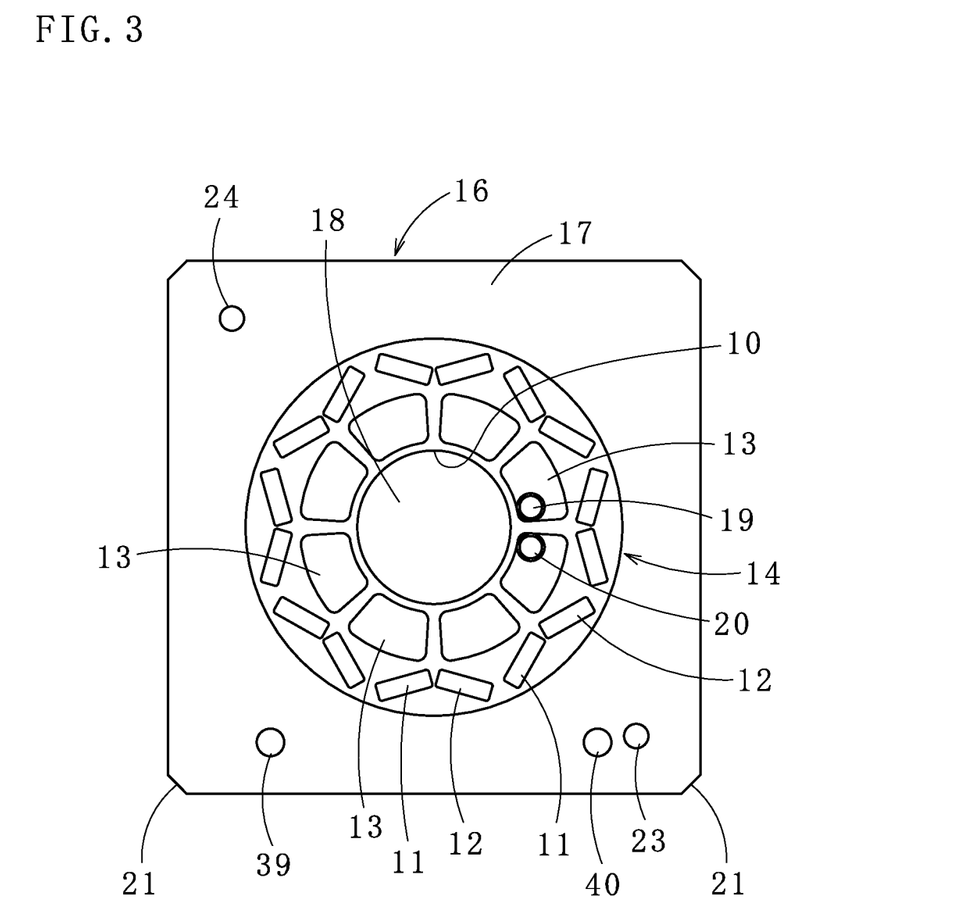
FIG. 3 is a plan view illustrating a laminated rotor core mounted on a carrying tray.

First, as illustrated in FIGS. 1(A), 2 and 3, a laminated core body 14 is manufactured by caulking and laminating core pieces made from pressed thin sheet materials made of magnetic materials. The laminated core body 14 has a shaft hole 10, a plurality of pairs of magnet insertion holes 11 and 12 and a plurality of punched holes 13, the shaft hole 10 being formed in the center, the plurality of pairs of magnet insertion holes 11 and 12 being formed around the shaft hole 10, and the plurality of punched holes 13 being formed between the shaft hole 10 and the magnet insertion holes 11 and 12 for weight reduction.

Additionally, the plurality of pairs of magnet insertion holes 11 and 12 and the plurality of punched holes 13 are individually formed axisymmetrically centering on the shaft hole 10, the plurality of pairs of magnet insertion holes 11 and 12 vertically penetrating the laminated core body 14.

Figure 6A:
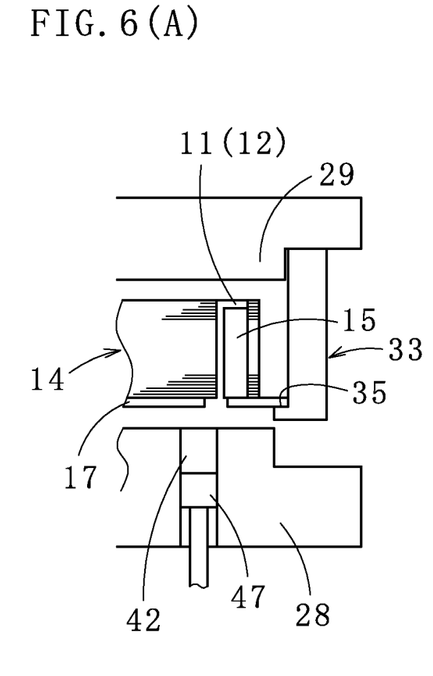
FIGS. 6(A) and 6(B) each are explanatory diagrams of a process of a method for manufacturing a laminated rotor core.
Figure 6B:
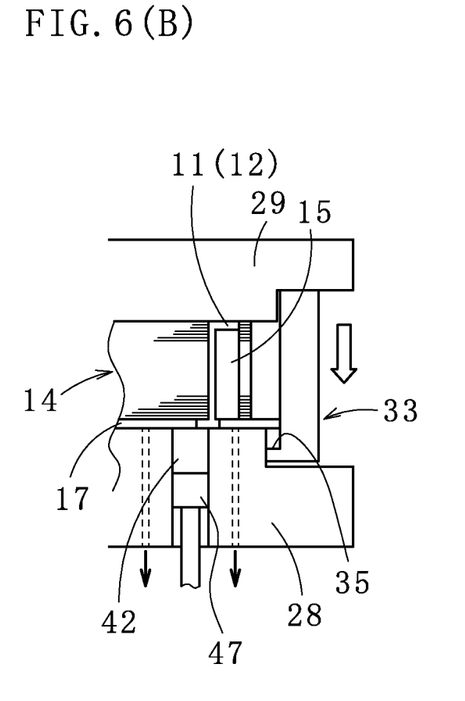
Figure 7A:
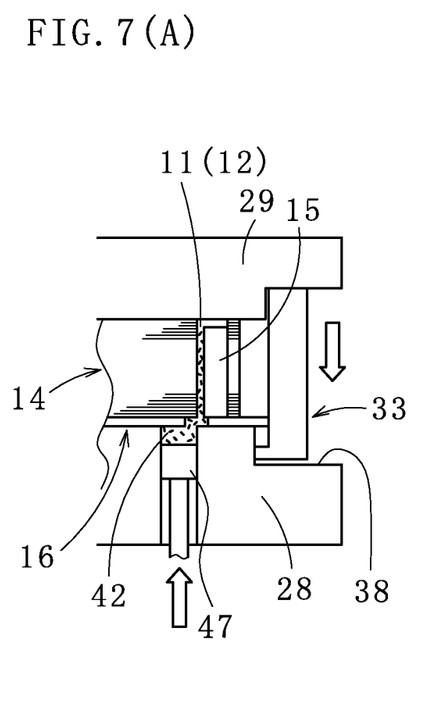
FIGS. 7(A) and 7(B) each are explanatory diagrams of a process of a method for manufacturing a laminated rotor core.
Figure 7B:
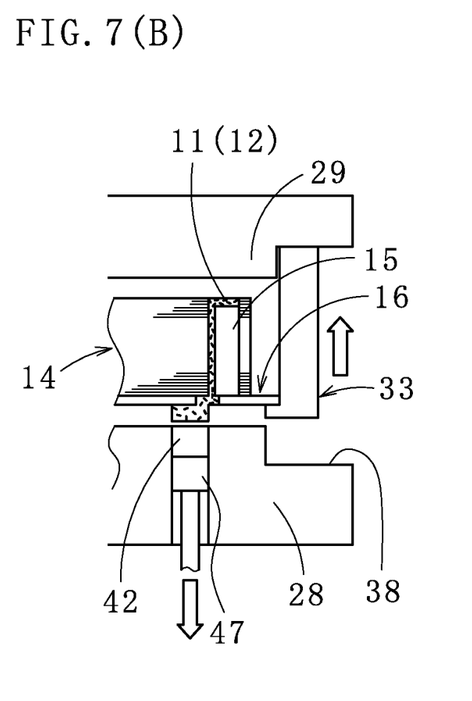

The magnet insertion holes 11 and 12 have permanent magnets 15 inserted therein prior to the resin-sealing (see FIGS. 6 and 7 for reference).

As illustrated in FIGS. 1-3 and 4(A), this laminated core body 14 is mounted on a carrying tray 16. The carrying tray 16 has a mounting table 17 and a shaft 18 standing in the center of the mounting table 17. A position on the carrying tray 16 to mount the laminated core body 14 is determined by fitting the shaft hole 10 to the shaft 18. Additionally, the mounting table 17 is provided with two first positioning pins 19 and 20 projecting upward from the mounting table 17 and being configured to come into contact with punched holes 13 of a laminated core body 14 to be mounted. The shaft is provided in the center of the carrying tray in this embodiment, however, there are cases where a shaft is omitted. In those cases, a mounting table and a carrying tray are one and the same, i.e., there is only a mounting table.

Figure 4A:
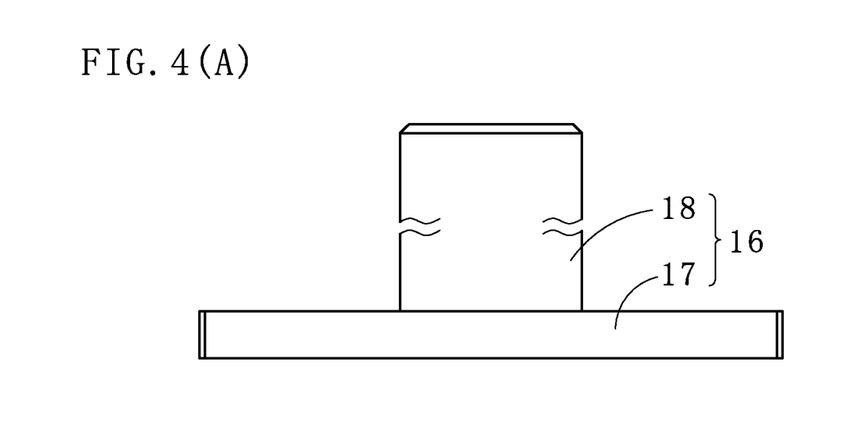
FIGS. 4(A) and 4(B) are a front view and a plan view of the carrying tray.

This enables the laminated core body 14 to be mounted at a predetermined angle in a predetermined position on the carrying tray 16 having the mounting table 17 with chamfers 21 on corner portions thereof and in a square shape in planar view. Additionally, the length of the shaft 18 is longer (approximately 5-20%) than the height of the laminated core body 14, and the tip portions of the shaft 18 and the first positioning pins 19 and 20 are chamfered in order to be easily inserted into the shaft hole 10 and the punched holes 13. The length of the projecting part of the shaft 18 can be shorter than the height of the laminated core body 14. In this case, it is only necessary to change a guide hole 30 formed in an upper die 29 described below to a guide projection.

As illustrated in FIG. 3, positioning holes 23 and 24 are formed at positions diagonal to one another on the mounting table 17, and as illustrated in FIG. 2, second positioning pins 25 and 26 to be inserted into these positioning holes 23 and 24 are provided projecting upward from the lower die 28. Also, a guide hole 30 into which the upper side portion of the shaft 18 is to be inserted is formed in an upper die 29, and paired supporting member 32 and 33 are provided on both sides of the upper die 29 for the positioning and temporal placement of the carrying tray 16 having the laminated core body 14 mounted thereon.

These supporting members 32 and 33 are L-shaped in a front view and have hooking portions 34 and 35 on the downsides thereof, the hooking portions 34 and 35 extending inward and horizontally, and both sides of the mounting table 17 of the carrying tray 16 are structured so as to be loaded by the unidirectional sliding (i.e., from the front side to the back side). Additionally, there are non-illustrated stoppers provided in the back side of the respective hooking portions 34 and 35, and the carrying tray 16 becomes situated (i.e., positioned) in the center position of the upper die 29 at the point where the rear end portions of both sides of the mounting table 17 come into direct contact with the stoppers.

As illustrated in FIG. 2, the length of a gap (i.e., distance) c between the top surfaces of the hooking portions 34, 35 and the upper die 29 is longer than the length of a thickness t of the mounting table 17 plus a height (h+a) of the shaft 18 in the slight range, for example, by (0.1-3%)×(t+h+a). This enables the laminated core body 14 mounted on the carrying tray 16 to be inserted from a horizontal direction. Here, h indicates the height of the laminated core body 14, and a indicates the length of the projecting part of the shaft 18 projecting from the upper end of the laminated core body 14. A depth b of the guide hole 30 formed in the center of the upper die 29 is greater than the length a of the projecting part of the shaft 18 projecting from the upper end of the laminated core body 14.

On the other hand, there are notches 37 and 38 provided on both ends of the upper side of the lower die 28, making a structure in which the lower ends of the supporting members 32 and 33 do not come into direct contact with the lower die 28. Also, as illustrated in FIGS. 3-5, the mounting table 17 is provided with through-holes 39 and 40 so as to hook and lock non-illustrated carrying jigs.

Figure 5:
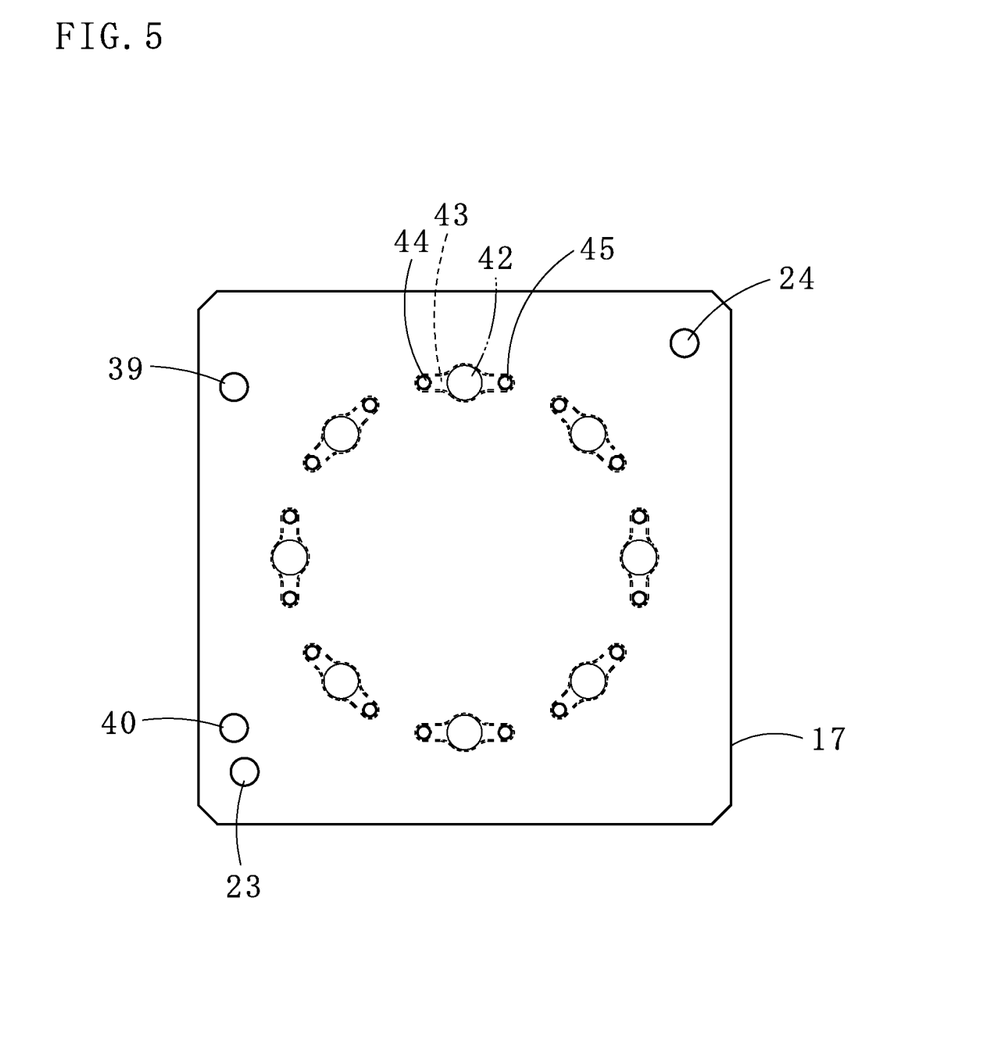
FIG. 5 is a plan view of a mounting table of the carrying tray.

As illustrated in FIGS. 5, 6(A) and 6(B), resin passages 43 are formed in the mounting table 17 composing the carrying tray 16 in order to guide resin from resin reservoir pots 42 to the magnet insertion holes 11 and 12 of the laminated core body 14, the resin reservoir pots 42 being formed in the lower die 28 and round-shaped in cross section. In this embodiment, there are eight resin reservoir pots 42 having a structure in which resin fills the two respective magnet insertion holes 11 and 12 through the resin passages 43 and through the gates 44, 45 formed penetrating to the upper portions (i.e., upper surface side of the mounting table 17) of the regions of the resin passages 43 from the bottom portions (i.e., lower surface side of the mounting table 17).

Figure 8A:
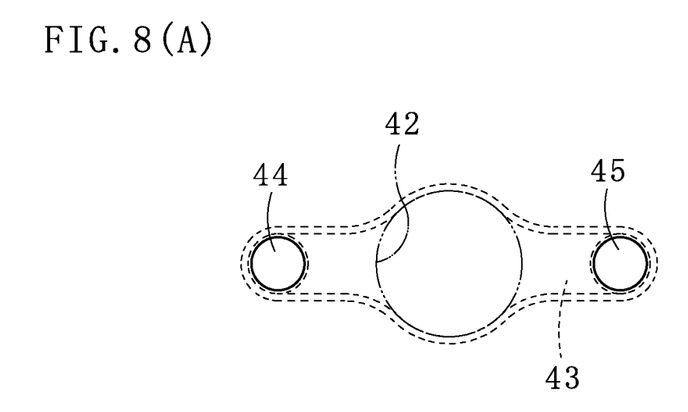
FIGS. 8(A) and 8(B) each are explanatory diagrams of a resin passage (runner) formed in a carrying tray.
Figure 8B:
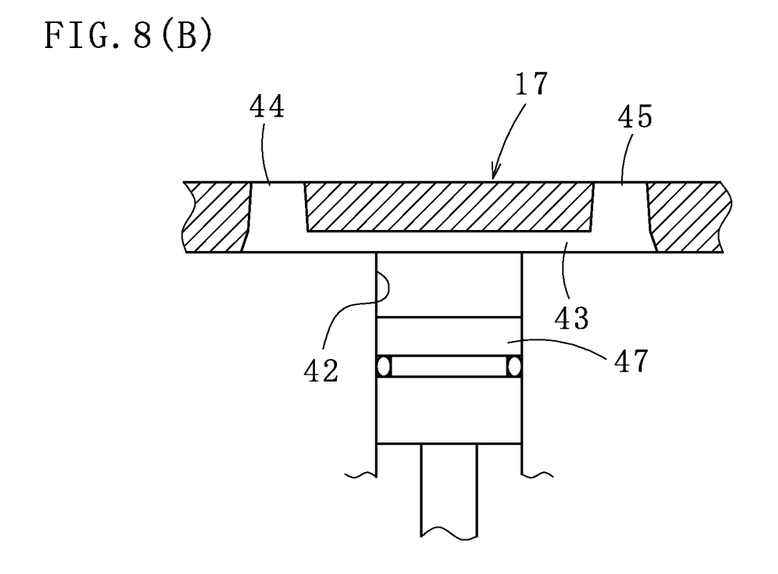

Detailed description of the resin passages 43 formed in the mounting table 17 will be given hereinafter with reference to FIGS. 5, 8(A) and 8(B). The resin passages 43 are formed right above the resin reservoir pots 42 which are round-shaped in cross section and formed in the lower die 28. These resin passages 43 bifurcate resin flown from the resin reservoir pots 42, and divide the resin flow so that the resin fills the pairs of magnet insertion holes 11 and 12 respectively through the gates 44 and 45 provided on both ends.

Figure 4B:
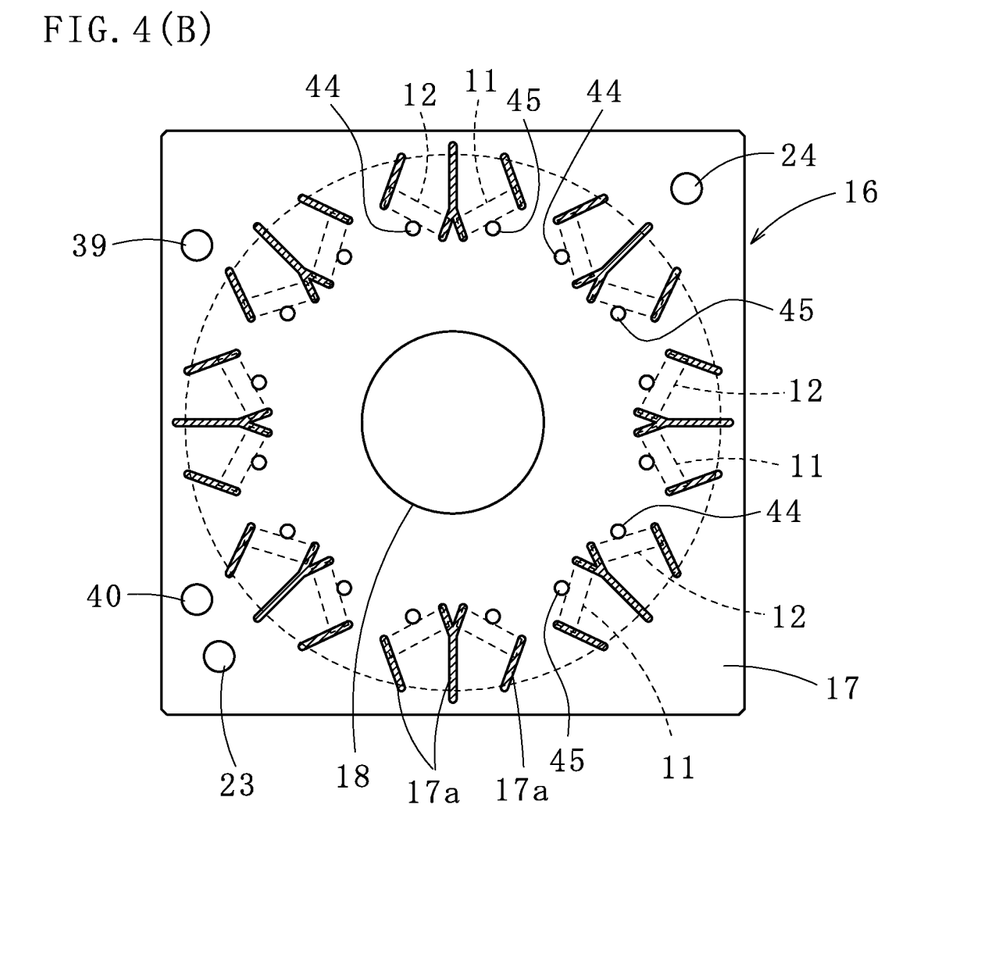

As illustrated in FIG. 4(B), when planarly viewed, the gates 44 and 45 overlap parts of the magnet insertion holes in the center, the parts being on the inner side in the radial direction of the laminated core body 14. Resin fills the magnet insertion holes 11 and 12 from the inner side to the region on the inner side in the radial direction so as to push the permanent magnets 15 inserted inside the magnet insertion holes 11 and 12 against the outer side in the radial direction. Additionally, the permanent magnets 15 can be pushed against the inner side in the radial direction by making the gates 44 and 45 overlap parts of the magnet insertion holes 11 and 12 on the outer side in the radial direction.

These resin passages 43 are in a tapered state in which they are formed on the downside of the mounting table 17 and opened downward (opened bottom portions) and the peripheral walls thereof are opened downward (i.e., outward) and inclined. This enables an easy removal of cured resin from the mounting table 17 when punching out.

Additionally, there are vent grooves 17a formed in the upper surface of the mounting table 17 for guiding the extra air from the magnet insertion holes 11 and 12 to the outside at the time of resin-sealing, the vent grooves 17a being extended from the outer circumference of the laminated core body 14 to the outside. It is preferred that the depths of these vent grooves 17a be smaller than the grain size of fillers mixed in sealing resin. Also, these vent grooves 17a are omissible.

Next, with reference to FIGS. 1(A)-1(H) and other drawings, detailed description of a method for manufacturing a laminated rotor core according to one embodiment of the present invention will be given.

As illustrated in FIG. 1(A), a laminated core body 14 in which core pieces are caulked and laminated is manufactured and mounted on a carrying tray 16. In this case, the laminated core body 14 is placed in a predetermined position on the carrying tray 16 by fitting a shaft hole 10 and punched holes 13 of the laminated core body 14 to a shaft 18 and first positioning pins 19 and 20 of the carrying tray 16, respectively (see FIG. 3 for reference). Alternatively, the carrying tray 16 can be arranged on a die apparatus, and core pieces can be serially laminated inside the die apparatus.

Figure 1B:
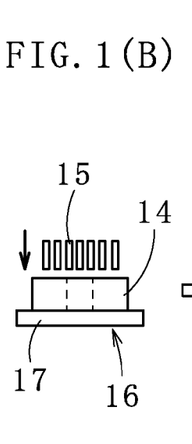

Next, as illustrated in FIG. 1(B), permanent magnets (non-magnetized) 15 are inserted into respective magnet insertion holes 11 and 12 of the laminated core body 14. In this case, the laminated core body 14 can be laterally inclined when inserting the permanent magnets 15. Then, as illustrated in FIG. 6(A), the laminated core body 14 mounted on the carrying tray 16 is mounted on hooking portions 34 and 35 of supporting members 32 and 33 of an upper die 29 (see also FIG. 2 for reference).

Figure 1C:
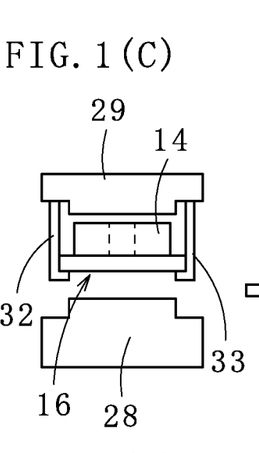

After this, as illustrated in FIGS. 1(C) and 2, the upper die 29 is moved downward in order to mount the carrying tray 16 on the lower die 28. Here, the second positioning pins 25 and 26 arranged projected on the lower die 28 are inserted into the positioning holes 23 and 24 formed in the mounting tray 17, determining the position of the carrying tray 16 on the lower die 28.

Figure 1D:
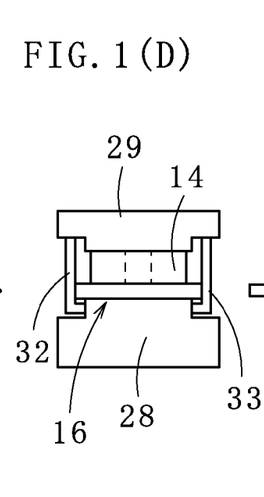

Then, as illustrated in FIGS. 1(D) and 6(B), the upper die 29 is lowered in order to clamp the laminated core body 14 mounted on the carrying tray by the upper die 29 and the lower die 28. Due to this, the upper portions of the magnet insertion holes 11 and 12 become occluded by the upper die 29, and the tip portion of the shaft 18 goes into a guide hole 30. The lower portions of the magnet insertion holes 11 and 12 come into direct contact with the mounting table 17, and parts of the gates 44 and 45 communicate with the lower portions of the magnet insertion holes 11 and 12 (see FIG. 4(B) for reference). Here, vent grooves for releasing the air inside the magnet insertion holes 11 and 12 at the time of resin-sealing can be formed in the upper die 29, and a plate having vent grooves formed thereon can be arranged between the laminated core body 14 and the upper die 29.

Under this condition, as illustrated in FIG. 7(A), resin heated and melted inside the resin reservoir pots 42 is pushed out by lifting a plunger 47, and the resin flows through the resin passages (runners) 43 to the gates 44 and 45 and fills the inside of the magnet insertion holes 11 and 12 through the gates 44 and 45. The permanent magnets 15 are thereby resin-sealed in a state of being pushed against the outer side in the radial direction inside the magnet insertion holes 11 and 12.

Figure 1E:
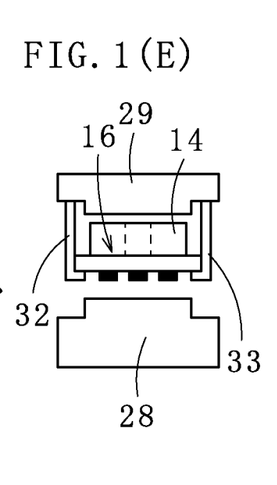

After the resin (thermosetting resin) is cured, as illustrated in FIGS. 1(E) and 7(B), the upper die 29 is moved upward. Consequently, resin remained and cured inside the resin reservoir pots 42 and on the resin passages 43 is, in a state of adhering to the carrying tray 16, pulled up with the carrying tray 16 and the laminated core body 14 of which the permanent magnets 15 are resin-sealed.

Figure 1F:
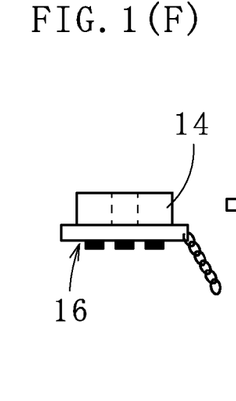
Figure 1G:
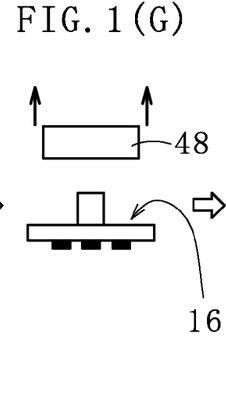

Next, as illustrated in FIG. 1(F), after removing the carrying tray 16 and the laminated core body 14 mounted on the carrying tray 16 from the supporting members 32 and 33 provided to the upper die 29, and removing the laminated core body 14 from the carrying tray 16 as illustrated in FIG. 1(G), a laminated rotor core 48 is completed. In this case, the cross-sectional surfaces of connecting portions for the gates 44, 45 and the magnet insertion holes 11, 12 are small, which enables an easy separation.

Figure 1H:
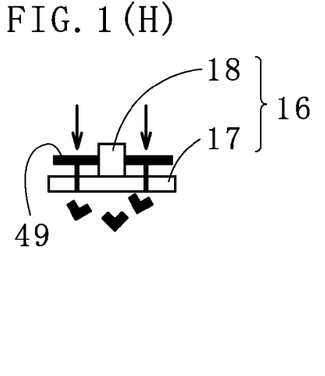
Figure 9A:
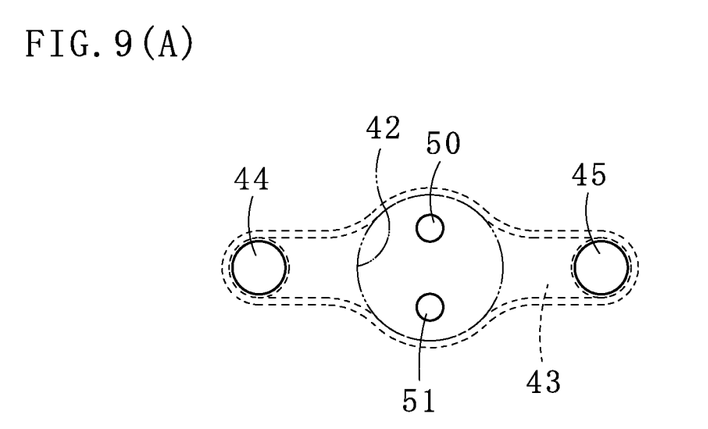
FIGS. 9(A) and 9(B) each are explanatory diagrams of a variation of a resin passage (runner) formed in a carrying tray.
Figure 9B:
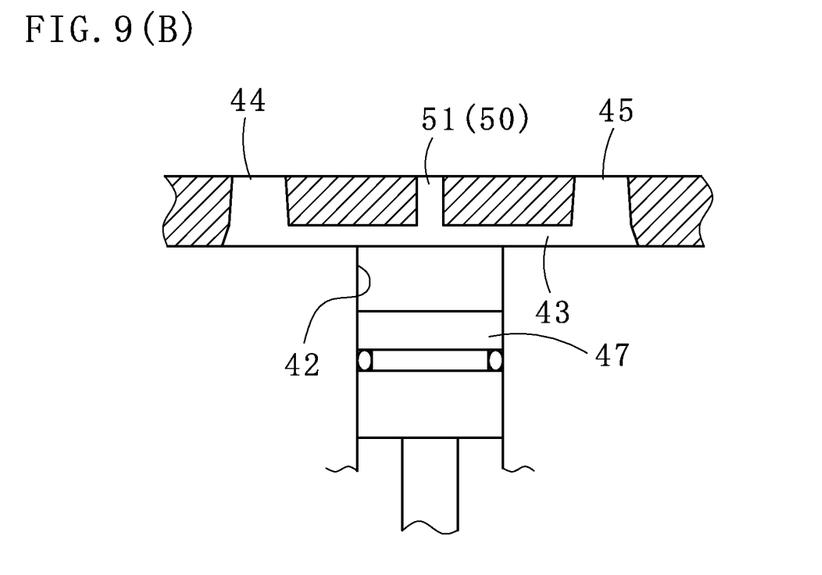

For the repeated use of the carrying tray 16, as illustrated in FIG. 1(H), jigs (pins) 49 are inserted into the gate holes 44 and 45 in order to remove unnecessary resin (cull). In this case, since the resin passages are in a tapered state in which they are opened downward, it is easy to detach resin. Additionally, as illustrated in FIGS. 9(A) and 9(B), by providing through-holes 50 and 51 on the upper portions in the central parts of the resin passages 43 and punching out resin inside the resin passages 43 by using separately-provided pin jigs in addition to the jigs (pins) 49 to be inserted into the gate holes 44 and 45, cured resin can certainly be punched out in one piece without being fractured.

The present invention is not limited to the above embodiments, and the structures thereof may be changed without departing from the scope of the present invention. For example, in the above embodiment, the upper die is moved upward and downward, however, the lower die can be moved upward and downward instead. Also, the supporting members of the carrying tray can be provided to the lower die. Moreover, a laminated core body can be mounted on or removed from the lower die manually without arranging the supporting members.

Furthermore, in the above embodiment, thermosetting resin is used as the resin for fixing the permanent magnets, however, different types of resins (e.g., thermoplastic resin) can alternatively be used as well. Additionally, in the embodiments described above, the laminated rotor core is mounted on the mounting table of the carrying tray by fitting the shaft center of the laminated rotor core to the shaft of the carrying tray. However, a laminated rotor core can be directly mounted on the mounting table by eliminating the shaft of the carrying tray. In this case, it is necessary to precisely position a laminated rotor core on the mounting table by using different positioning means (e.g., pins, and concavity and convexity), etc.

INDUSTRIAL APPLICABILITY

Since a laminated rotor core in which a plurality of core pieces are laminated is carried by being mounted on a carrying tray, and magnet insertion holes are resin-sealed from a lower die through the carrying tray, carrying a laminated rotor core and mounting a laminated rotor core on a resin-sealing die become simplified, leading to a productivity improvement.

REFERENCE SIGNS LIST

10: shaft hole, 11, 12: magnet insertion hole, 13: punched hole, 14: laminated core body, 15: permanent magnet, 16: carrying tray, 17: mounting table, 17a; vent groove, 18: shaft, 19, 20: first positioning pin, 21: chamfer, 23, 24: positioning hole, 25, 26: second positioning pin, 28: lower die, 29: upper die, 30: guide hole, 32,33: supporting member, 34, 35: hooking portion, 37, 38: notch, 39, 40: through-hole, 42: resin reservoir pot, 43: resin passage, 44, 45: gate, 47: plunger, 48: laminated rotor core, 49: jig, 50, 51: through-hole

The invention claimed is:

1. A method for manufacturing a laminated rotor core having a shaft hole formed in the center of laminated core and a plurality of magnet insertion holes formed around the shaft hole and in which permanent magnets are inserted into the respective magnet insertion holes and resin-sealed, the method comprising:
   from an initial state with a laminated core body separated from a carrying tray and the laminated core body oriented in a first orientation, performing a first step of positioning and mounting the laminated core body on an upper surface of a carrying tray with the laminated core body in the first orientation;
   a second step of positioning and arranging the carrying tray with a lower surface of the carrying tray on a lower die with the laminated core body mounted on the upper surface of the carrying tray and with the laminated core body remaining in the first orientation, the laminated core body having the permanent magnets inserted into the respective magnet insertion holes thereof, and clamping the laminated core body mounted on the carrying tray by an upper die and the lower die; and
   a third step of pushing resin out of resin reservoir pots provided in the lower die and filling the respective corresponding magnet insertion holes of the laminated core body with the resin through resin passages and gates, the resin passages being formed in the carrying tray in a tapered state and having opened bottom portions, peripheral walls of the resin passages being opened downward and inclined, the gates being formed in the regions of the resin passages and penetrating from the bottom portions to upper portions.

2. The method for manufacturing a laminated rotor core according to claim 1, wherein
   through-holes are formed on the upper portions of the resin passages besides the gates, and after resin-sealing the laminated core body, resin remained on the carrying tray is punched out by pins passing through the through-holes.

3. The method for manufacturing a laminated core body according to claim 2, wherein
   the lower die is provided with a plurality of the resin reservoir pots, and resin flown from one resin reservoir pot fills one or more of the magnet insertion holes through the resin passage.

4. The method for manufacturing a laminated rotor core according to claim 1, wherein
   the carrying tray is rectangular-shaped in planar view, and paired supporting members are provided on both sides of the upper die for the positioning and temporal placement of the carrying tray having the laminated core body mounted thereon.

5. The method for manufacturing a laminated core body according to claim 4, wherein
   the positioning of the laminated core body and the carrying tray is performed through at least two first positioning pins and punched holes, the first positioning pins projecting upward from the carrying tray, the punched holes being formed by vertically penetrating the laminated core body.

6. The method for manufacturing a laminated rotor core according to claim 5, wherein
   the positioning of the carrying tray and the lower die is performed by at least two second positioning pins and positioning holes, the second positioning pins being formed in the lower die and projecting upward, the positioning holes being formed in the carrying tray and into which the second positioning pins are to be inserted.

7. The method for manufacturing a laminated rotor core according to claim 4, wherein
   vent grooves are formed in the carrying tray in order to release the air inside the magnet insertion holes to the outside at the time of resin-sealing.

8. The method for manufacturing a laminated rotor core according to claim 4, wherein
   the carrying tray is provided with a shaft to be inserted into a shaft hole of the laminated rotor core.

9. The method for manufacturing a laminated rotor core according to claim 1, wherein
the carrying tray is not vertically inverted between said first and second steps.

\* \* \* \* \*